(12) United States Patent
Wong

(10) Patent No.: US 7,490,355 B2
(45) Date of Patent: Feb. 10, 2009

(54) METHOD OF DETECTING NETWORK WORMS

(75) Inventor: Hsing-Kuo Wong, Taoyuan County (TW)

(73) Assignee: Chung Shan Institute of Science and Technology, Taoyuan County (TW)

( * ) Notice: Subject to any disclaimer, the term of this patent is extended or adjusted under 35 U.S.C. 154(b) by 782 days.

(21) Appl. No.: 11/153,606

(22) Filed: Jun. 16, 2005

(65) Prior Publication Data

US 2006/0288415 A1   Dec. 21, 2006

(51) Int. Cl.
*G06F 21/00* (2006.01)
(52) U.S. Cl. ....................................... 726/24
(58) Field of Classification Search ............. 726/22–26; 709/223–229
See application file for complete search history.

(56) References Cited

U.S. PATENT DOCUMENTS

2006/0173992 A1* 8/2006 Weber et al. ................ 709/224

* cited by examiner

*Primary Examiner*—Gilberto Barron, Jr.
*Assistant Examiner*—Abdulhakim Nobahar
(74) *Attorney, Agent, or Firm*—Birch, Stewart, Kolasch & Birch, LLP

(57) ABSTRACT

A method of detecting network worms include the following steps: (1) Profiling the TCP connection information collected from the protected network, quantifying the plurality of statuses contained in the TCP connection information; (2) Clustering the connection profiles to discover all the anomaly clusters that are specified by the condition composing of several adaptive thresholds; (3) Correlating the anomaly clusters to result in a new cluster graph or to extend an existing cluster graph; (4) Issuing a security incident about the worm propagation according to the propagation condition that also composes of several adaptive thresholds; and (5) Keeping and maintaining the status of the cluster graphs.

20 Claims, 6 Drawing Sheets

METHOD OF DETECTING NETWORK WORMS

BACKGROUND

1. Field of Invention

This invention relates to a method of detecting computer viruses (hereinafter as viruses) and, in particular, to a method of detecting network worms (hereinafter as worms.)

2. Related Art

A worm is a malicious program that exploits the vulnerabilities existing in popular network services of computers to propagate it. A computer virus and worm are both took as a kind of malicious programs. However, viruses propagate themselves by infecting and parasiting a host (such as a program, file, or storage medium), their propagation mainly relies on the negligence of computer users or the opportunities of file sharing. Therefore, the speed and breadth of the propagation of viruses are not as well as the ones of worms. Note that the characteristic of worms usually causes a serious congestion of network traffic as they propagate. An infected computer usually propagates the worm hosting in it excessively. In order to propagate the worms, the infected computer usually scans other computers continuously with the best effort, and therefore its behavior forms a feature of situation that there are many scanning continually originated from the infected computer. According to the survey for several popular anti-virus (AV) companies, the number of worms (including their variations) found per year are about four hundred. Due to the characteristic of worms that they propagate themselves by exploiting the internet, most of them also tend to perform some network attacks. Aside from AV software, a few intrusion detection systems (IDS) are also able to detect a few specific worms. For example, the well-known open source IDS—Snort—can detect the CodeRed and Nimda worms. However, most of worm detection is done by AV software. For known malicious programs or worms, AV software is usually able to effectively determine whether a program residing in a computer or on a delivery is malicious. AV software can detect worms quickly by matching them with the code signature of known worms. However, for an unknown worm (i.e. new worm) or a worm variation, their detection methods may be ineffective. For example, the appearance of the MS-IIS CodeRed or Nimda worm have made a huge amount of Web or email servers fail to service normally and result in serious network congestion. The subsequent Blaster worm or Sasser worm also cause wide propagation and great damages to networks in a very short time. For such unknown types or variations of worms, AV or IDS software can only ask users to download new detection methods. As the software fails in detecting such new types or variations of worms, there appears a zero day in the AV protection or IDS detection for all users, companies, or institutes. Normally, once a new type or variations of virus or worm has been discovered, the AV company is usually able to release an updated version to defense it during a few hours or to a few days. However, the public users or servers may need a few weeks to a month in order to update their AV software with the defense against the new types or variations of viruses or worms. The IDS detection method may take a longer time. In other words, the zero day of IDS detection is longer than the one of AV protection. During the zero-day period, the IDS and AV software are unable to detect the propagation of any new type or variations of worms, but only the flooding or scanning events. In the AV protection safety period, the AV software becomes able to detect and then product detection reports about them. Finally, in the IDS detection safety period, the IDS can also detect and then product worm events (see Table 1).

TABLE 1

| | Worm prevention and detection zero day | | |
|---|---|---|---|
| Information security events | IDS detection zero day AV protection zero day | IDS detection safety period AV protection safety period | |
| Flooding event | x | x | x |
| Scanning event | x | x | x |
| Detection report | | x | x |
| Worm event | | | x |

The observations or phenomena above are repeatedly appearing and consistent with the conclusion inferred from Table 1. When new types or variations of worms appear, there forms a zero day of the AV protection or IDS detection. During this period, the original detection and protection software all fail to defense against them. This disadvantage of prior art in the worm prevention and detection of course fail to prevent such damage. This is why the worms can propagate widely and cause great damage. The essential reason why the prior art is ineffective in detecting unknown types or variations of worms is due to the fact that the current worm detection method is based upon certain fixed signatures or activities left by malicious programs. The former method is essentially the same as the typical virus detection method, whereas the latter checks whether the system parameter or registry is written with specific mutex or values or they leave certain files. These types of methods are effective for detecting known malicious programs, but obviously ineffective for the unknown types. This argument is also supported by the fact that AV or security related companies keep asking users to download latest updates or worm variations detection codes and the fact that there are a lot of damage or financial loss due to new worms.

The prior art also suffers from inconvenience in use. Because they can only detect known malicious programs, their client (including personal users, companies and institutes) have to regularly download new virus codes or update their protection programs. This is a burden. Once there is a miss of update or downloading, the protection or detection zero day shown in Table 1 will be formed again.

In view of the foregoing facts, it is imperative to design a new detection method for detecting new types or variations of worms.

SUMMARY

The invention designs a method of detecting network worms that utilizes the TCP connection information and the worm propagation model to detect unknown types and variations of worms.

To achieve the above objectives, the disclosed method includes the steps: profiling the TCP connection information collected from the protected network, quantifying the plural states contained in the TCP connection information; clustering the connection profiles to discover all the anomaly clusters that are specified by the condition composing of several adaptive thresholds; correlating the anomaly clusters to result in a new cluster graph or to extend an existing cluster graph; issuing a security incident about the worm propagation according to the propagation condition that also composes of several adaptive thresholds; and keeping and maintaining the status of the cluster graphs.

In summary, the disclosed method can indeed effectively use the TCP connection information and worm propagation model to detect unknown types and variations of worms.

BRIEF DESCRIPTION OF THE DRAWINGS

The invention will become more fully understood from the detailed description given hereinbelow illustration only, and thus are not limitative of the present invention, and wherein.

DETAILED DESCRIPTION

Worm programs are usually very complicated; their behaviors are also versatile. In the beginning, they only scan others using some specific ports. However, their subsequent variations often randomly open local ports and their targets are also random. There may be many combinations of attack methods. It is thus very difficult to detect them. However, one can still find a solution by studying the basic principles of worm propagation.

We have studied all the known worms (starting from the CodeRed worm discovered in 2000.) After analyzing and classifying their behaviors, we have found their fundamental behaviors and devised a detection method accordingly. The common behaviors of the worms are as follows. In order to self-propagate and actively implant themselves to computers on the network, the worm has to take advantage of the vulnerability of those computers—the security flaws of network service software. Therefore, it has to try the weak points of the computers on the network. Once vulnerability is found, it will successfully implant a worm program into that system. The implanted (i.e. infected) computer is forced to immediately download a more complete worm program, install it in the system, and start worm propagation. The newly started worm behaviors are similar to the original worms. They also detect vulnerabilities of other computers and implant programs to those systems. All the discovered worms have the behaviors mentioned above. Once the behaviors of a worm deviate away from this model, it propagates less efficiently and thus results in smaller affection.

In accord with the above description, the technical idea of the invention is to collect the TCP connection information of the protected network and to find out the TCP clusters with the same propagation features. If clusters of the same type are detected within a short time, it is determined as the propagation of worms.

Figure 1:
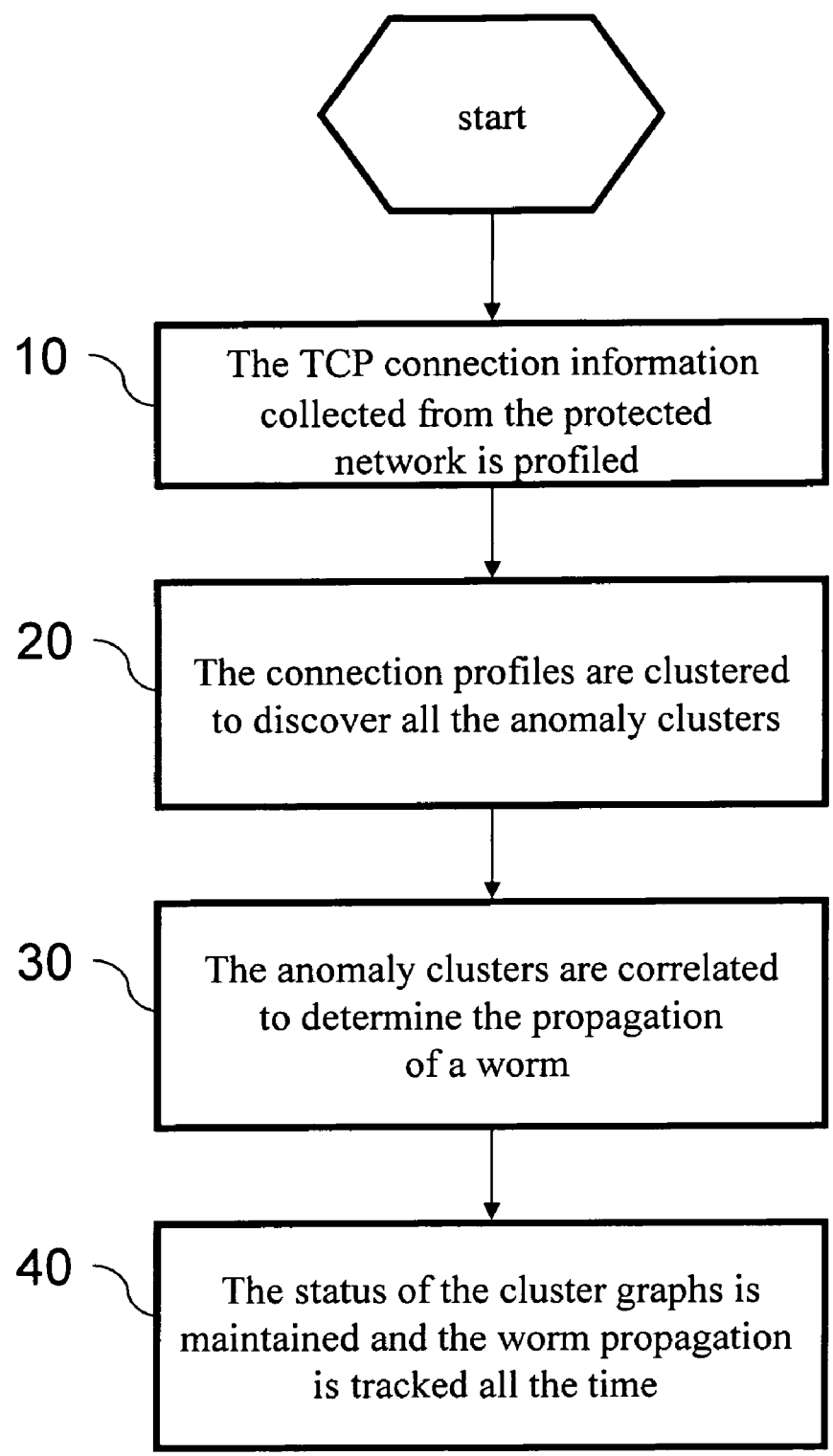
FIG. 1 is a preferred embodiment of the disclosed method.
Figure 2A:
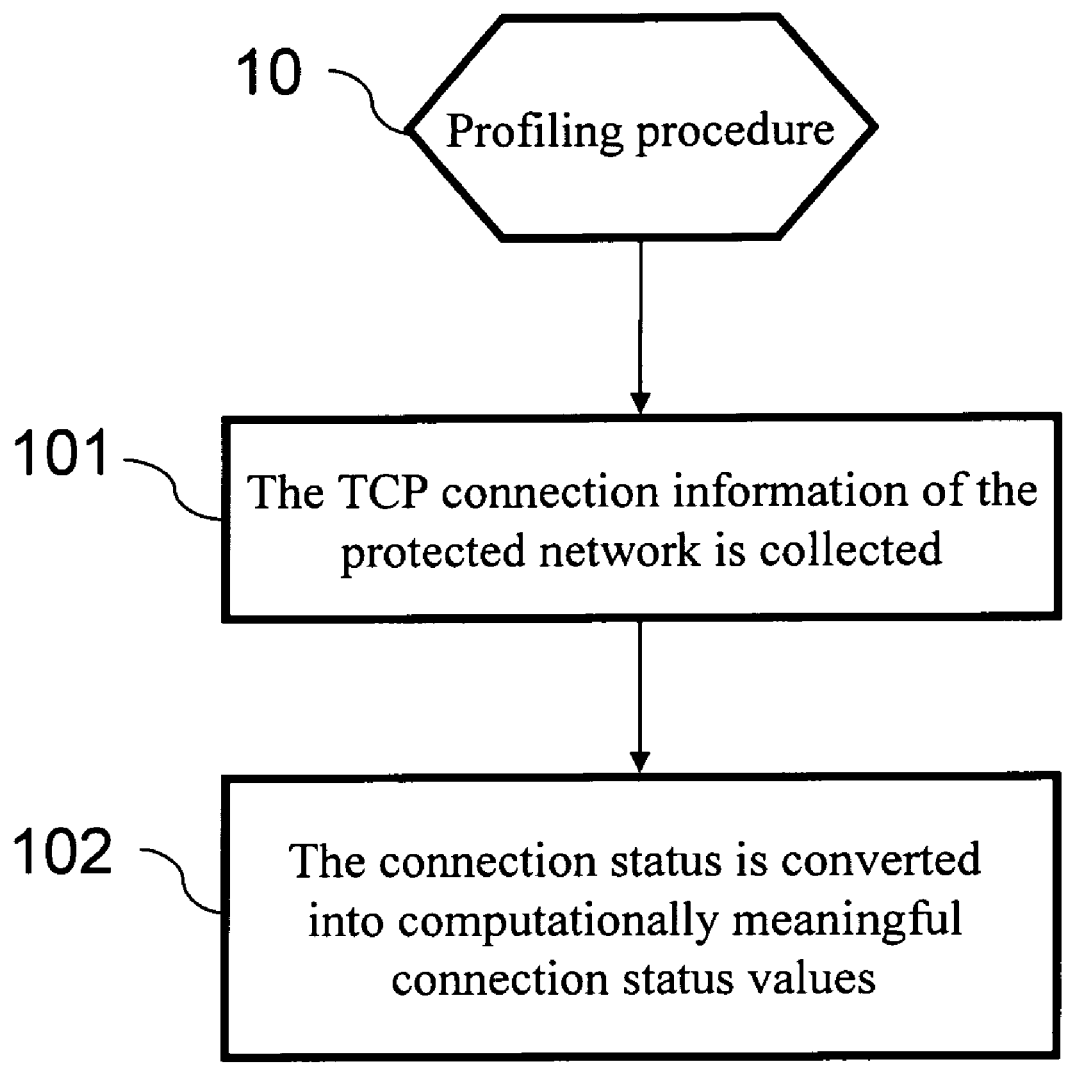
FIG. 2A is a flowchart of clustering the connection profiles to discover all the anomaly clusters.
Figure 2B:
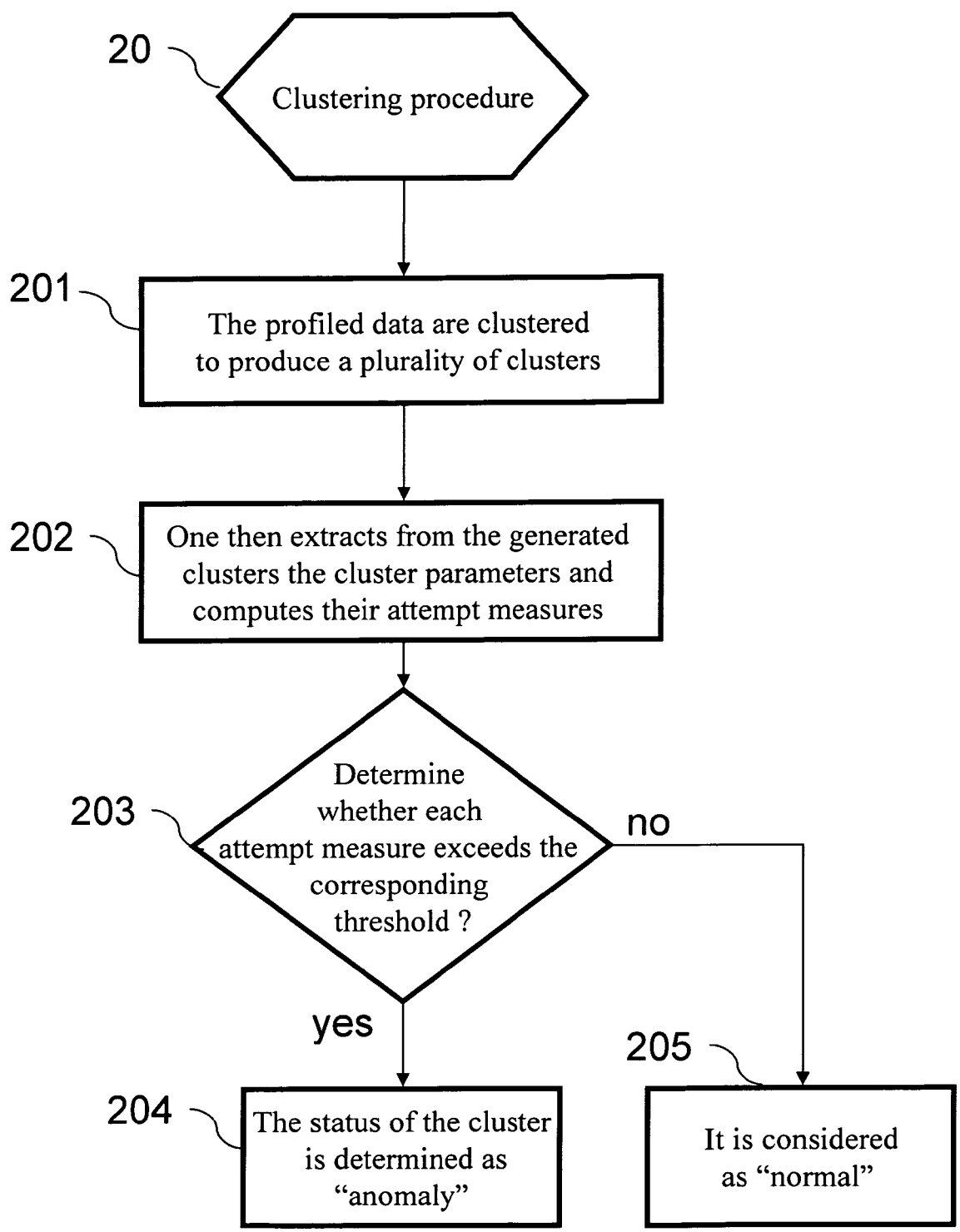
FIG. 2B is a flowchart of clustering to discover all the anomaly clusters that are specified by the condition composing of several adaptive thresholds.
Figure 2C:
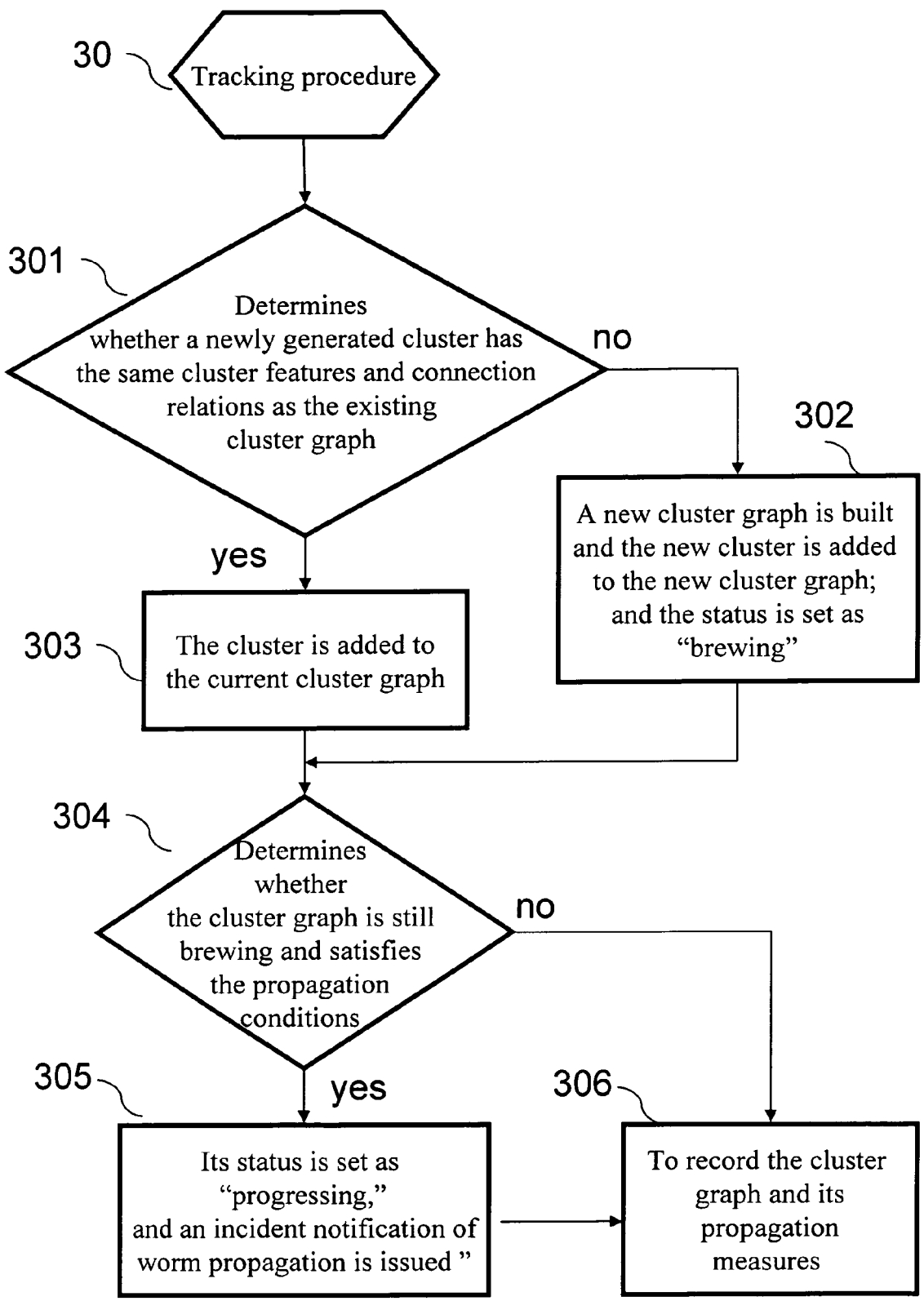
FIG. 2C is a flowchart of correlating anomaly clusters and determining the worm propagation activities.
Figure 2D:
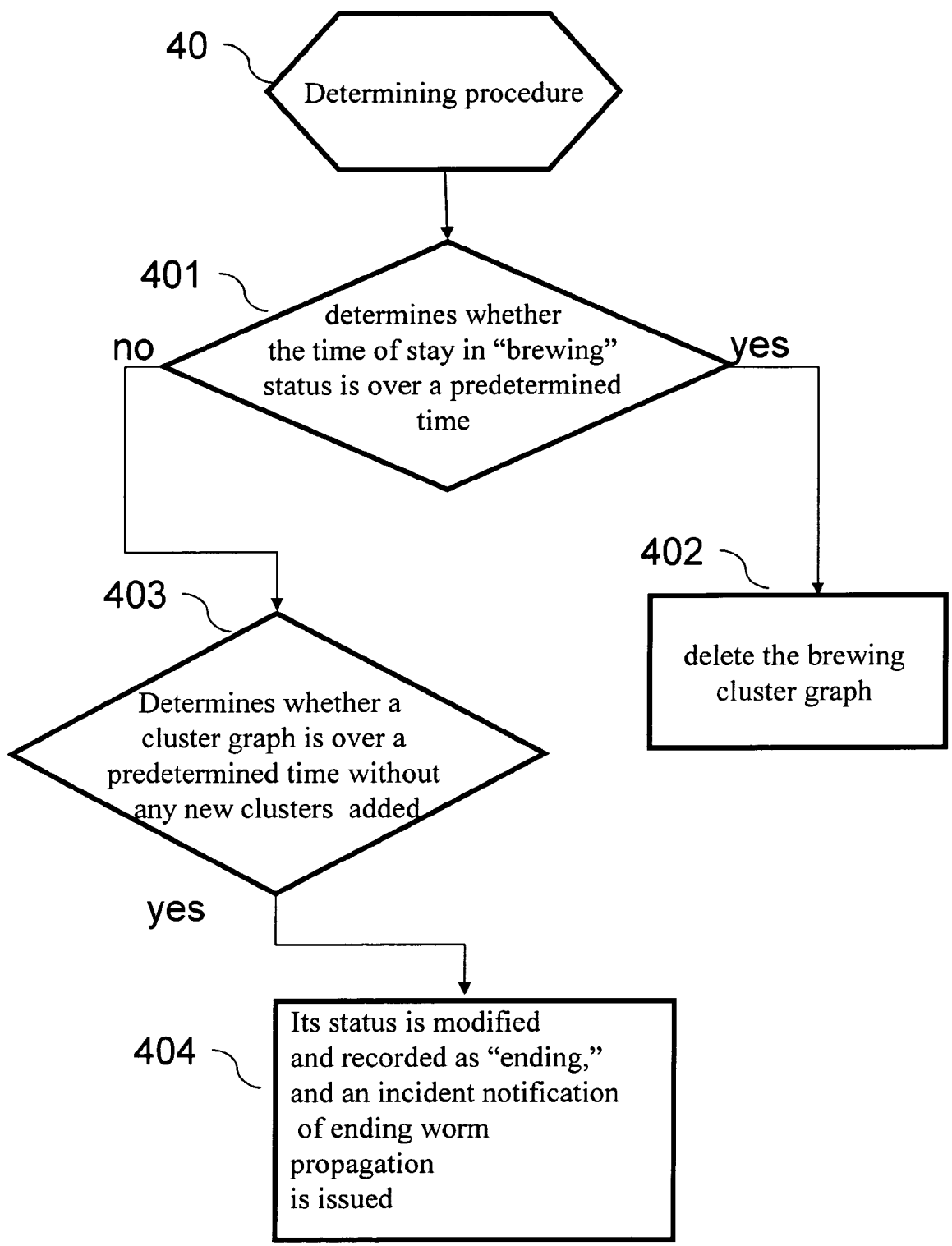
FIG. 2D is a flowchart of maintaining the status of a cluster graph and tracking whether a worm propagation activity is continuing.

FIG. 1 is a preferred embodiment of the disclosed method. The method includes the following steps. In step 10, the TCP connection information collected from the protected network is profiled. In step 20, the connection profiles are clustered to discover all the anomaly clusters that are specified by the condition composing of several adaptive thresholds. In step 30, the anomaly clusters are correlated to determine the propagation of a worm. In step 40, the status of the cluster graphs is maintained and the worm propagation is tracked all the time.

In FIGS. 2A to 2D, we explain the main steps in the disclosed method.

Step 10 further includes the following steps. The TCP connection information of the protected network is collected in step 101. The connection parameters are extracted from the collected TCP connection information. The connection status is converted into computationally meaningful connection status values in step 102. In particular, the connection parameters include at least the connection time, the IP addresses and ports of the source and the target. The connection status values include at least the values of connection "attempted", "established" and "failed", and even others grouped as "don't care."

Step 20 further includes the following steps. The profiled data are clustered to produce plural clusters in step 201. The clustering calculation can be a conventional one (we do not repeat the description herein), so that the connection parameters in each cluster have similar features, such as similar data time, same connection attempts and target ports.

One then extracts from the generated clusters the cluster parameters and computes their attempt measures in step 202. The cluster parameters include a least the connection time, the cluster center IP, and the exploited port. The attempt measures include at least the cluster size, the attempted connection times, the established connection ratio, and the failed connection ratio. In particular, the established connection ratio and the failed connection ratio refer to their respective proportions in all the attempted connections.

For each cluster, we determine whether each attempt measure exceeds the corresponding threshold in step 203. If so, then the status of the cluster is determined as "anomaly" in step 204. Otherwise, it is considered as "normal" in step 205. The threshold values are determined according to the studies of worm propagations on the network. They can be predetermined by the system and allowed for adjustment. The "anomaly" clusters are left for further investigation because they may belong to worm propagations.

Step 30 further includes the following steps. Step 301 determines whether a newly generated cluster has the same cluster features and connection relations as the existing cluster graph. If not (either no existing cluster graph or conditions not met), a new cluster graph is built and the new cluster is added to the new cluster graph; and the status is set as "brewing" in step 302. Otherwise, the cluster is added to the current cluster graph in step 303. In particular, the cluster graph is a directed graph. Each node represents a cluster. The direct edge connecting two nodes represent the cluster centers of them have a connection relation. The cluster features include at least the ports used by the cluster. Each cluster graph maintains corresponding propagation measures, including at least the establishing time of the cluster graph and the number of clusters contained therein. When a cluster graph is newly generated, it's establishing time is recorded. When a cluster is added to a cluster graph, the number of clusters therein has to be updated too. For example, in FIG. 3 node A is connected to node B. This means that the center IP of the cluster A has attempted or established a connection to the center IP b of the cluster B.

After steps 302 and 303, step 304 determines whether the cluster graph is still brewing and satisfies the propagation conditions. If yes, then its status is set as "progressing," and an incident notification of worm propagation is issued in step 305. To record the cluster graph and its propagation measures in step 306 and the other case in step 304. The satisfaction of propagation conditions for the cluster graph can be set to be that all propagation values exceed the corresponding thresholds, which are determined according to the studies of worm propagations on the network or predetermined by the system and open for adjustment. Finally, the latest statuses and propagation values of the cluster graphs are recorded.

Step 40 further includes the following steps. For each brewing cluster graph, step 401 determines whether the time of stay in "brewing" status is over a predetermined time. If so, then delete the brewing cluster graph in step 402. For each progressing cluster graph, step 403 determines whether the time of no more new clusters to be added is over a predetermined time. If so, then its status is modified and recorded as "ending," and an incident notification of ending worm propagation is issued in step 404. The ended cluster graph is no longer correlated with subsequently generated clusters. The two time thresholds mentioned above are determined according to the studies of worm propagations on the network or predetermined by the system and open for adjustment.

Figure 3:
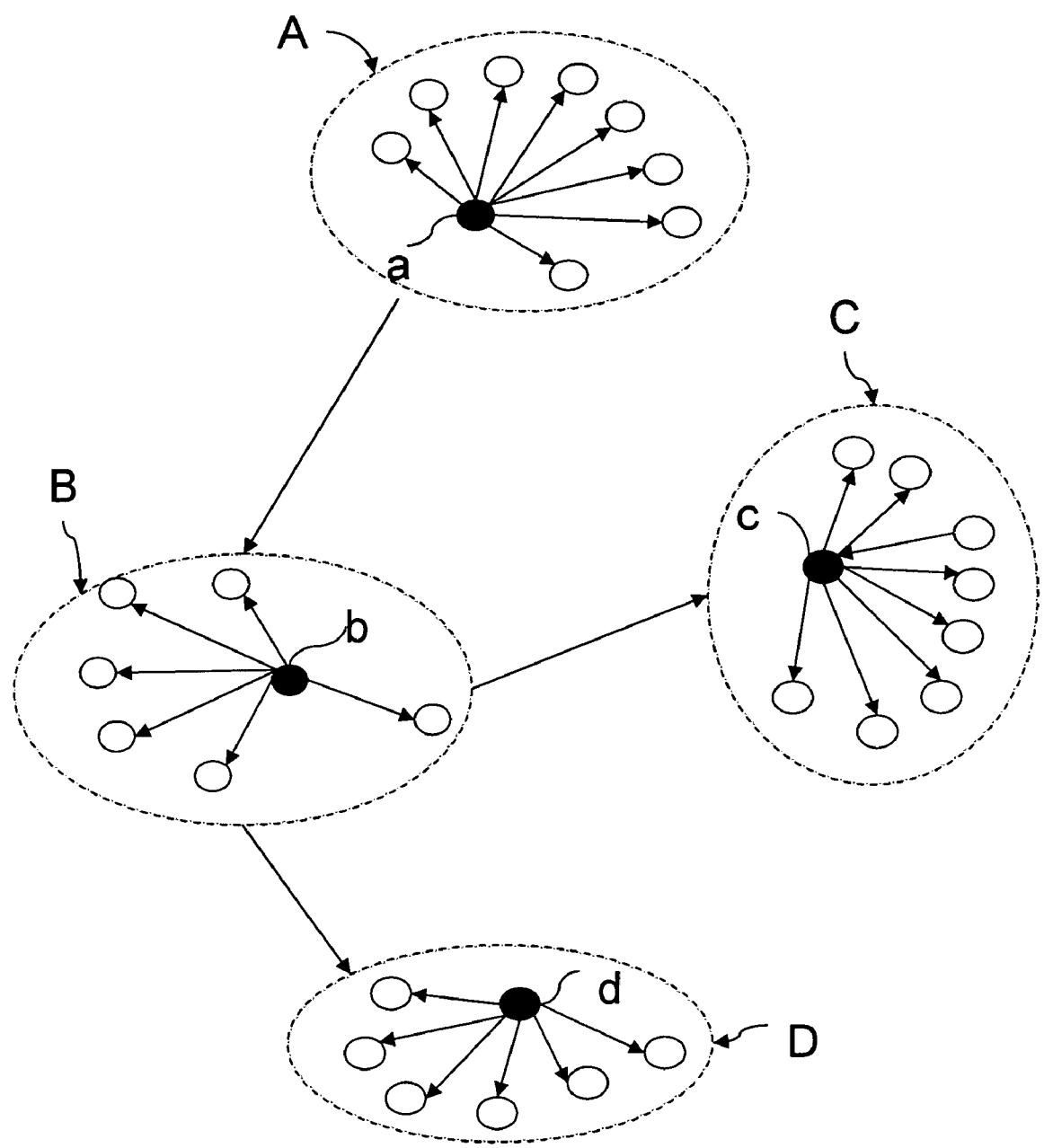
FIG. 3 is a schematic view of a cluster graph according to a preferred embodiment.

FIG. 3 illustrates a preferred embodiment of a cluster graph and shows how it is generated. There are four clusters A, B, C, and D in the drawing. Suppose cluster A is the anomaly cluster that is discovered earliest. It has the propagation model of starting from the center an outwards. When the newly discovered anomaly cluster B is found to contain a connection relation between a and b and the same cluster features as cluster A, it is added to the cluster graph. Likewise, when the anomaly cluster C is found to contain a connection relation between b and c and the same cluster features as cluster B, it is added to the current cluster graph too.

The above-mentioned "anomaly", "progressing", "brewing" and "ending" are the terms used to refer to a specific status in the method. They should not be used to restrict the specific statuses.

The worm propagation model reflects the basic behaviors of the worms. Any behavior deviating from this model may be other network behaviors. For example, suppose a hacker extensively scans port 80. Even through the TCP connection information of his scanning behavior can be formed a cluster, it still lacks other clusters having the same cluster features. Also, the peer-to-peer (P2P) files sharing also results in similar clustering. However, each cluster is not large (because the P2P connection is mainly used for file transfers and therefore the number of connections established by each host computer is apparently much smaller than the host computer infected by worms), the failed connection ratio is lower (because the infected host computer tries random connections out and therefore the failed connection ratio is higher), and the number of clusters is obviously fewer. Therefore, the invention uses various threshold values (e.g. cluster size, number of clusters, failed connection ratio, etc) to effectively avoid misjudgment.

In summary, the disclosed method can indeed efficiently use the TCP connection information and the worm propagation model to detect unknown types and variations of worms. The disclosed method has the following advantages.

1. The invention is not affected by the hacking techniques of packing or encoding worm programs or by changing the worm port.
2. The invention does not require the user to frequently update the protection program or detecting code.
3. The invention can efficiently shorten or eliminate the zero day of various IDS detection and AV protection.
4. The invention has the function of self-protection. When there are too many brewing cluster graphs to be formed, steps 401, 402, 403, and 404 of the disclosed method can prevent the system resources from being used up. That is, the invention has the cluster-flood prevention function.

Certain variations would be apparent to those skilled in the art, which variations are considered within the spirit and scope of the claimed invention.

What is claimed is:

1. A method of detecting network worms, comprising:
   profiling connection information of a protected network to generate connection parameters and connection status values;
   clustering the connection profile of the connection parameters and the connection status values to generate a plurality of clusters;
   extracting cluster parameters from the generated clusters and computing attempt measures of the clusters;
   determining whether any of the clusters is an anomaly cluster;
   correlating the newly generated anomaly cluster with an existing cluster graph and adding it into the cluster graph if the correlation is successful or establishing a new cluster graph with the newly generated anomaly cluster if the correlation is unsuccessful, each of the cluster graph being appended with its status and a propagation measure;
   determining whether a worm propagation activity is going on for cluster graphs that satisfy a specific propagation condition;
   eliminating a cluster graph that does not satisfy the propagation condition within a first predetermined time; and
   claiming the ending of the worm propagation activity of a cluster graph that does not have new cluster added to it within a second predetermined time.

2. The method of claim 1, wherein the connection information is TCP connection information.

3. The method of claim 1, wherein the connection parameters include at least a connection time, an IP address of and a port of a source, and an IP address of and a port of a target.

4. The method of claim 1, wherein the connection status is selected from the group consisting of an attempted connection, an established connection, and a failed connection.

5. The method of claim 1, wherein the cluster parameters include at least a connection time, a cluster center IP, and an exploited port.

6. The method of claim 1, wherein the attempt measures include at least a cluster size, a number of attempted connections, an established connection ratio, and a failed connection ratio, the established connection ratio and the failed connection ratio being the ratios of established connections and failed connections to the number of attempted connections, respectively.

7. The method of claim 1, wherein the anomaly cluster is identified when each of its attempt measures exceeds a corresponding threshold value.

8. The method of claim 7, wherein the corresponding threshold value is determined by a method selected from system determination or manual adjustment.

9. The method of claim 1, wherein a successful cluster correlation happens when the cluster has a same cluster feature and a connection relation with some cluster in the cluster graph.

10. The method of claim 9, wherein the cluster feature is a port used by the cluster.

11. The method of claim 9, wherein the connection relation between the cluster and another cluster in the cluster graph is an attempted or established connection from the center IP of the former to the center IP of the latter 12. The method of claim 1, wherein the status of the cluster graph is selected from brewing, progressing and ending.

13. The method of claim 1, wherein the propagation measures include at least an establishing time and a number of clusters contained therein.

14. The method of claim 1, wherein the newly established cluster graph is in the status of brewing.

15. The method of claim 1, wherein the propagation condition is that each of the propagation measures of the cluster graph exceeds its corresponding threshold value.

16. The method of claim 15, wherein the corresponding threshold values are determined by a method selected from system determination or manual adjustment.

17. The method of claim 1, wherein if the cluster graph satisfying the propagation condition is originally in the status of brewing, then the status is changed to progressing and a worm propagation incident notification is issued.

18. The method of claim 1, wherein the first predetermined time is determined by a method selected from system determination or manual adjustment.

19. The method of claim 1, wherein for the cluster graph that does not have any new clusters to be added within the second predetermined time the status is set as ending and a worm propagation ended incident notification is issued.

20. The method of claim 1, wherein the second predetermined time is determined by a method selected from system determination or manual adjustment.

* * * * *